United States Patent [19]
Fisher et al.

[11] Patent Number: 5,937,114
[45] Date of Patent: Aug. 10, 1999

[54] MICRO-PHOTONICS MODULE WITH A PARTITION WALL

[75] Inventors: Lawson H. Fisher, Portola Valley; Gary R. Trott, San Mateo; Gerald J. Gleason, Los Altos, all of Calif.; Robert William Musk, Ipswich, United Kingdom

[73] Assignee: Hewlett-Packard Company, Palo Alto, Calif.

[21] Appl. No.: 08/897,801

[22] Filed: Jul. 21, 1997

[51] Int. Cl.[6] ................................................... G02B 6/12
[52] U.S. Cl. .................................................................. 385/14
[58] Field of Search ............. 385/14, 2–3; 361/748–796; 438/61, 62

[56] References Cited

U.S. PATENT DOCUMENTS

| | | | |
|---|---|---|---|
| 3,754,170 | 8/1973 | Tsuda et al. | 317/235 R |
| 4,967,248 | 10/1990 | Shimizu | 357/54 |
| 5,034,856 | 7/1991 | Cook et al. | 361/424 |
| 5,124,281 | 6/1992 | Ackerman et al. | 437/209 |
| 5,181,216 | 1/1993 | Ackerman et al. | 372/36 |
| 5,256,590 | 10/1993 | Inoue | 438/61 |
| 5,285,512 | 2/1994 | Duncan et al. | 385/94 |
| 5,291,572 | 3/1994 | Blonder et al. | 385/94 |
| 5,479,335 | 12/1995 | Saito et al. | 363/65 |
| 5,481,629 | 1/1996 | Tabuchi | 385/14 |
| 5,600,130 | 2/1997 | VanZeghbroeck | 250/214.1 |

*Primary Examiner*—John D. Lee
*Assistant Examiner*—Ellen E. Kang
*Attorney, Agent, or Firm*—Thomas X. Li

[57] ABSTRACT

A micro-photonics device is described that includes a substrate and a plurality of optical and electrical components mounted on the substrate. The optical and electrical components form a transmitter and a receiver. A wall is mounted on the substrate to physically separate some of the components from other components to prevent electrical and optical interference between the transmitter and receiver. The wall mounted on the substrate may also be mounted with electrical and optical components of the micro-photonics device. In this case, the wall physically separates the components mounted on the substrate from the components mounted on the wall to prevent electrical and optical interference. Moreover, the wall with the mounted components may simply be attached to a side surface of the substrate.

9 Claims, 7 Drawing Sheets

MICRO-PHOTONICS MODULE WITH A PARTITION WALL

BACKGROUND OF THE INVENTION

1. Field of the Invention

The present invention pertains to fiber optics or photonics modules. More particularly, this invention relates to a micro-photonics module having a partition wall to provide isolation among various components of the micro-photonics module.

2. Description of the Related Art

Optical communications systems are widely used for carrying very large amount of information with low distortion and at low cost over great distances. For this reason, considerable development has been made on components of optical communication systems, such as photonics packages or modules. Photonics generally refer to devices that share both electronic and optical attributes. These devices can be laser devices, which generate coherent light in response to an electronic signal, and photo detectors, which generate an electronic signal in response to light.

A bidirectional photonics module typically includes a transmitter formed by at least one laser and a receiver formed by at least one photo detector. The laser is typically an edge emitting semiconductor laser and the photo detector is typically a surface detecting photo detector. Since an edge emitting laser has a relatively wide radiation angle, a lens is inserted between the laser and an optical fiber to obtain high optical coupling efficiency. In addition, a lens is typically inserted between the optical fiber and a photo detector. The inserted lens improves the optical coupling efficiency between the optical fiber and the photo detector. Because the photonics module is a bidirectional module, an optical filter is used to reflect the light beam emitted from the optical fiber to the photo detector and to allow the light beam from the laser to reach the optical fiber.

In making such a bidirectional photonics module, all of the optical components must be in precise predetermined alignment with one another to form the transmitter and receiver. To achieve this, fixtures and/or mounts are typically needed to hold the components in place and in alignment with one another.

Disadvantages are, however, associated with such photonics modules or packages. One disadvantage is that such prior art photonics modules are typically relatively costly to fabricate because they typically require relatively high precision. Another disadvantage is that it is typically time consuming to assemble the photonics modules using the fixtures, thus causing low throughput. In addition, time may also be needed for alignment and adjustment during assembling the photonics modules. This typically hinders mass-production of the photonics modules by persons having a moderate level of skill while maintaining the required alignment criteria. These factors typically limit the cost reduction of the photonics modules. Moreover, these photonics modules typically have relatively large size because of the fixtures.

One prior solution is to mount all or most components of a photonics module on a single mounting member or substrate. This, however, creates optical interferences between the transmitter and receiver of the photonics module. For example, some of the light from the laser reflected off the corresponding spherical lens can be picked up by the receiving photo detector, thus causing optical interference. Moreover, because a photonics module also includes electrical components as well as optical components, metal leads are required on the mounting member if the electrical components are to be mounted with the optical components on the same mounting member. When this occurs, the metal leads may function like antenna to generate electrical interference that affect the performance of the optical components (e.g., the laser or photo detector).

SUMMARY OF THE INVENTION

One of the features of the present invention is to allow electrical and optical components of a micro-photonics module to reside on a single substrate without optical and electrical interferences.

Another feature of the present invention is to provide electrical and optical isolation between a transmitter and a receiver of a micro-photonics module residing on a single substrate.

A further feature of the present invention is to allow a micro-photonics module to be manufactured cost effectively.

Described below is a micro-photonics device that includes a substrate and a plurality of optical and electrical components mounted on the substrate. The optical and electrical components form a transmitter and a receiver. A wall is mounted on the substrate to physically separate some of the components from other components to prevent electrical and optical interference between the transmitter and receiver.

In accordance with another embodiment of the present invention, the wall mounted on the substrate may also be mounted with electrical and optical components of the micro-photonics device. In this case, the wall physically separates the components mounted on the substrate from the components mounted on the wall to prevent electrical and optical interference. Moreover, the wall may be simply attached to a side surface of the substrate. In this case, the wall still provides electrical and optical isolation between the components on the substrate and the components on the wall.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
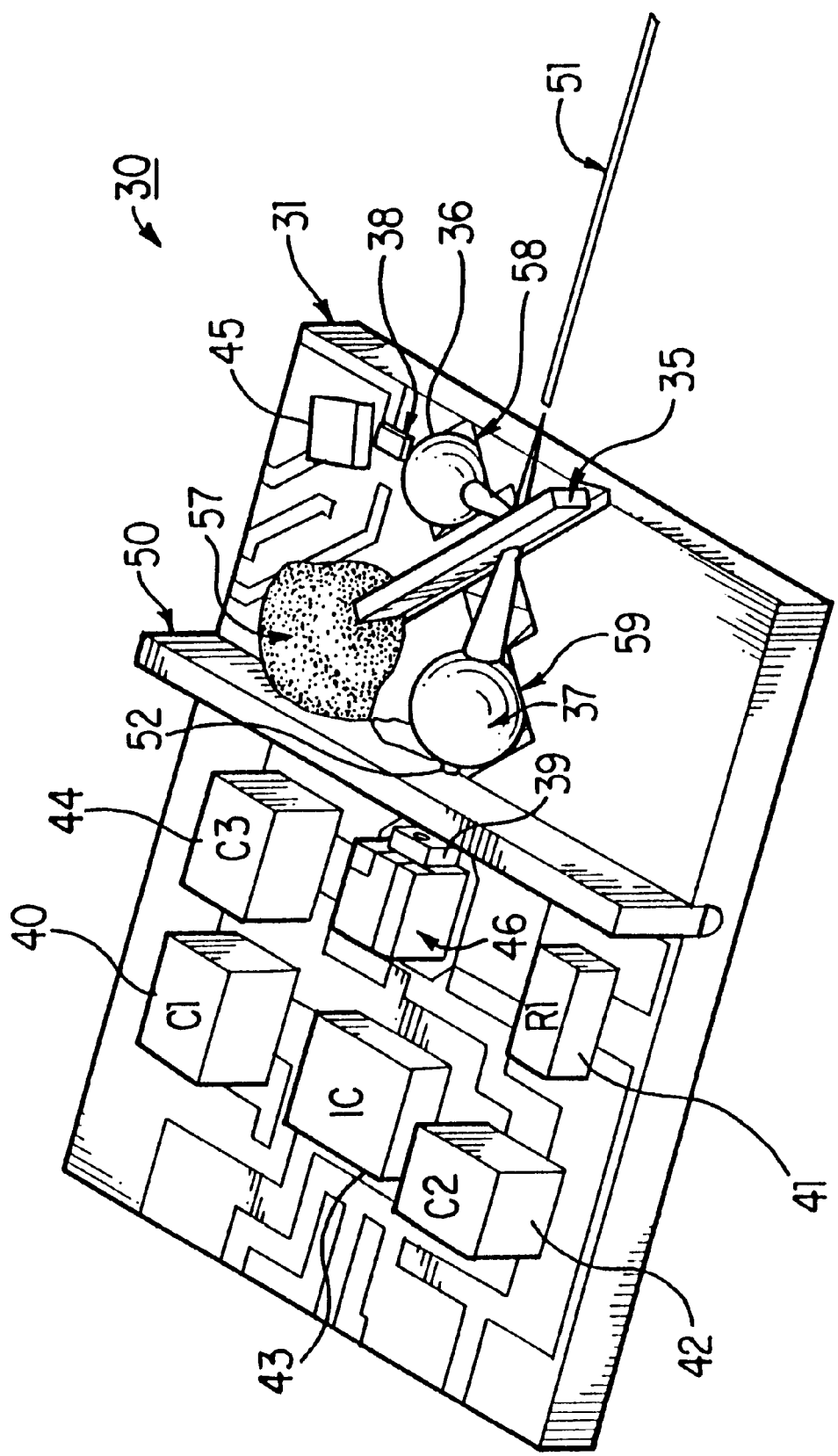
FIG. 1 is a perspective view of a photonics module in accordance with one embodiment of the present invention.
Figure 2:
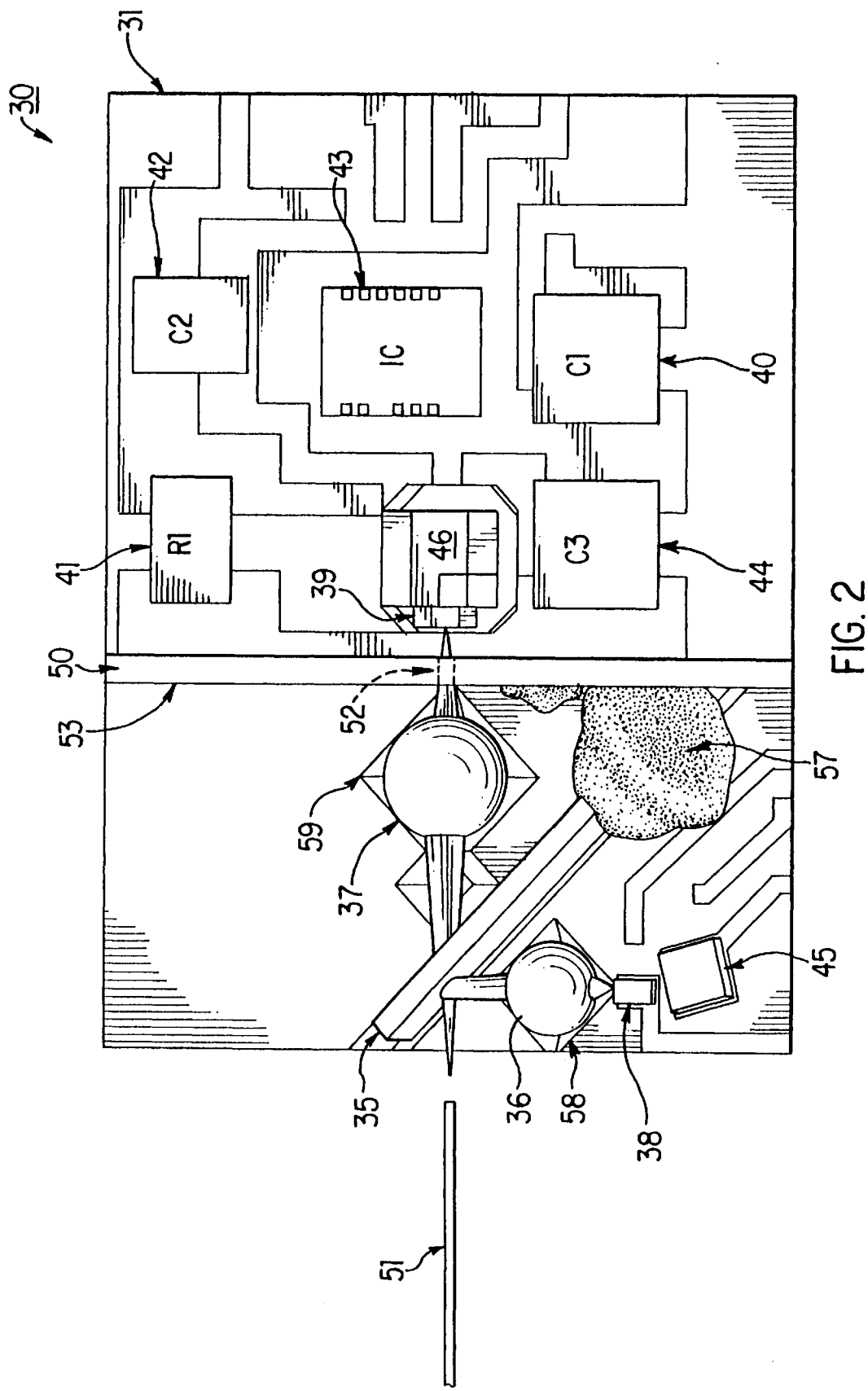
FIG. 2 is a top view of the photonics module of FIG. 1.

FIGS. 1 and 2 show a photonics module 30 with its components (i.e., components 35 through 45) residing on a single mounting member 31. The components 35–45 integrated on the mounting member 31 include both optical components (i.e., components 35–39 and 45) and electrical components (i.e., components 40–44). These components 35–45 form an optical transmitter and an optical receiver.

In accordance with one embodiment of the present invention, a partition wall 50 is mounted on the mounting member 31 to prevent electrical and optical interference between the optical transmitter and receiver of the photonics module 30. This allows the components 35–45 of the photonics module 30 to be integrated together onto the same mounting member 31. By integrating the components 35–45 of the photonics module 30 on the single mounting member 31, the size of the photonics module 30 is significantly reduced. In addition, the cost of fabricating the photonics module 30 is reduced because only one mounting member (i.e., the mounting member 31) is required.

Figure 3:
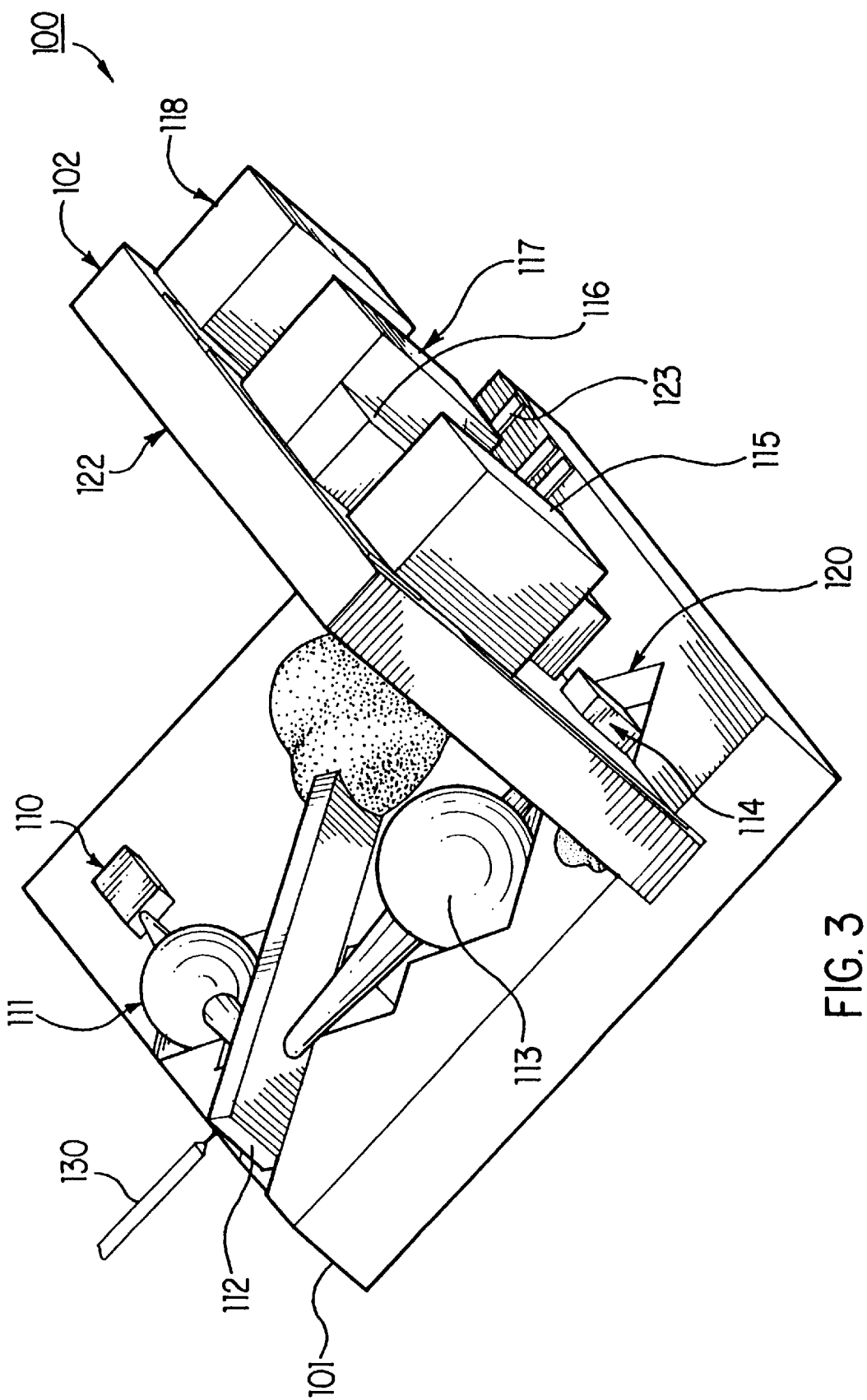
FIG. 3 is a perspective view of another photonics module that implements another embodiment of the present invention.
Figure 4:
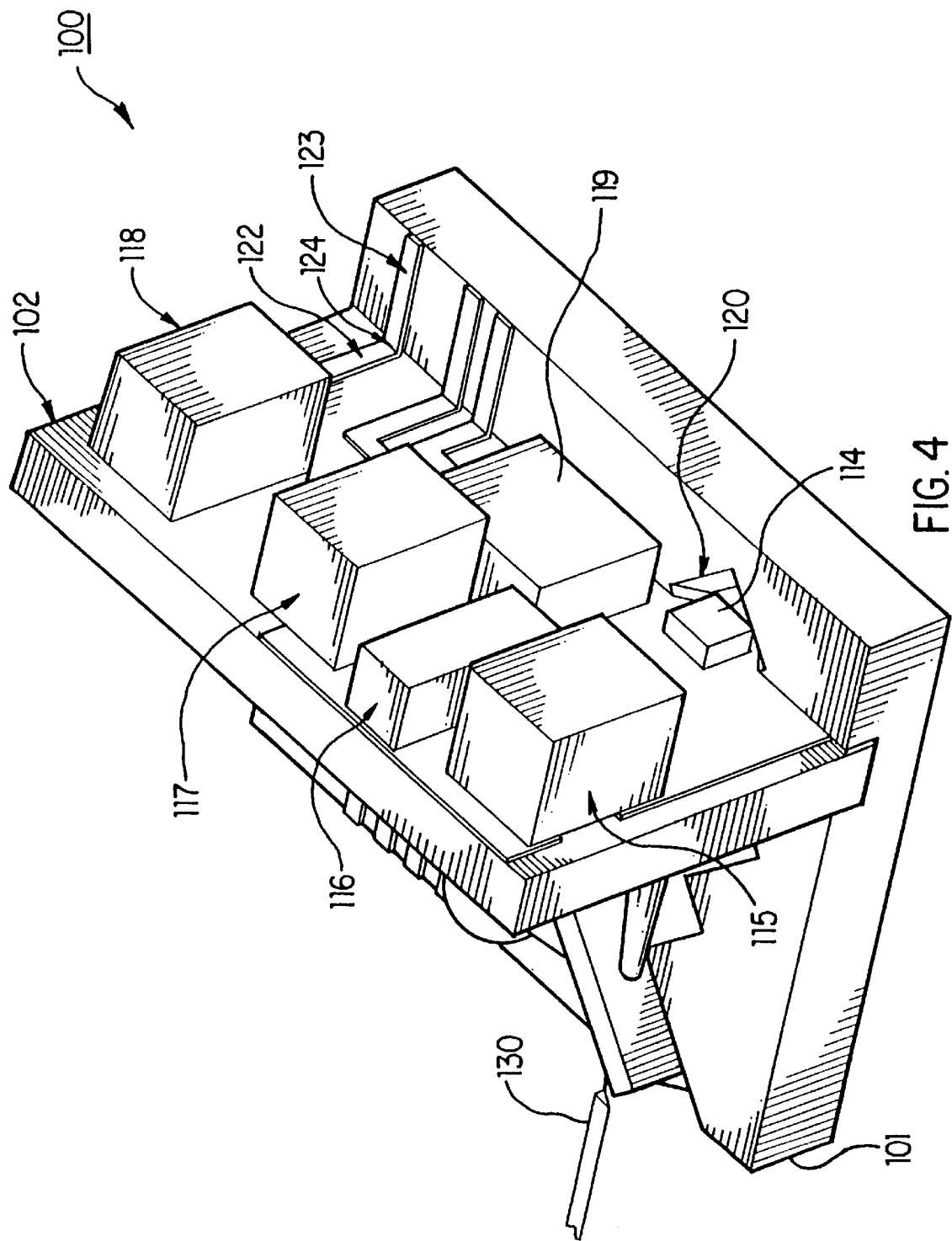
FIG. 4 is another perspective view of the photonics module of FIG. 3.
Figure 5:
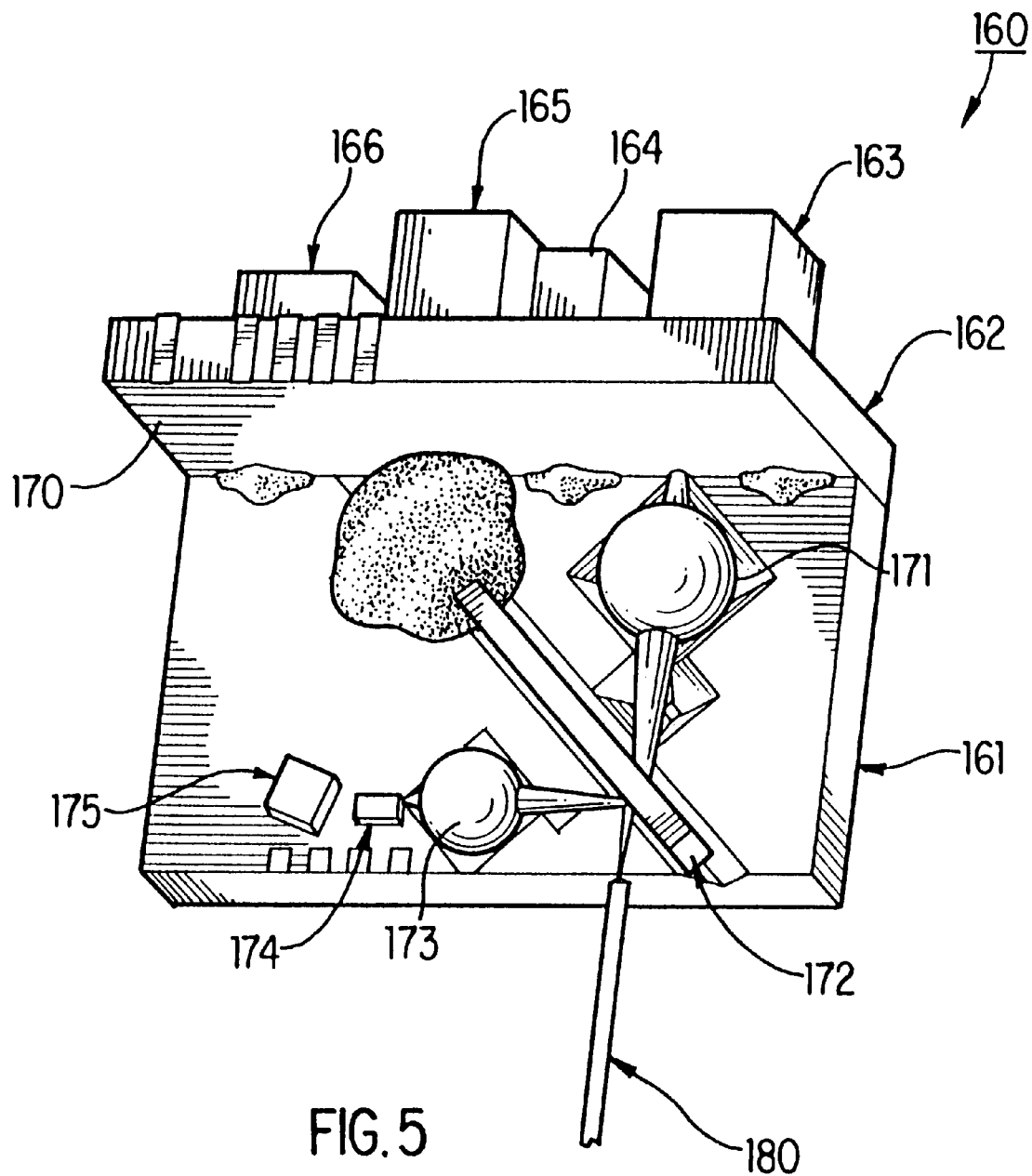
FIG. 5 a perspective view of yet another photonics module that implements another embodiment of the present invention.

Moreover, the cost of making a photonics module can be further reduced by mounting some of the components on the partition wall. This approach is shown in FIGS. 3 through 5, which will be described in more detail below. As a result, the size of the mounting member (i.e., the mounting member 101) is reduced, which reduces the cost of the mounting member. In addition, the components mounted on the partition wall (i.e., the partition wall 102) can come as a fully tested module prior to the assembly of the photonics module (i.e., the photonics module 100), simplifying the assembly process of the photonics module.

Referring back to FIGS. 1–2, the photonics module 30 is a bidirectional photonics module. Alternatively, the photonics module 30 may not be bidirectional. For example, the photonics module 30 may be tri-directional or unidirectional.

The optical components 35–39 and 45 of the photonics module 30 include a laser 38, spherical lenses 36 and 37, a planar optical filter 35, a photo detector 39, and a back facet photo detector 45. The back facet photo detector 45 serves as a monitor of the laser 38. An external optical fiber 51 is actively aligned to the spherical lenses 36 and 37 via the optical filter 35 after the components of the photonics module 30 have been assembled. The laser 38, the monitor 45, and the spherical lens 36 form the optical transmitter of the photonics module 30 and the photo detector 39 and the spherical lens 36 form the optical receiver of the photonics module 30. The planar optical filter 35 is shared by both the transmitter and the receiver. Alternatively, the photonics module 30 may function with more or fewer than above-described components.

The electrical components 40–44 of the photonics module 30 include capacitors 40, 42, and 44, a resistor 41, and an integrated circuit 43. These electrical components 40–44 are electrically connected to the photo detector 39 and are part of the optical receiver of the photonics module 30. It is to be noted that photonics module 30 is not limited to those electrical components and may include more or fewer electrical components.

In one embodiment, the mounting member 31 is made of silicon. Using silicon for the mounting member 31 allows the optical components 35–39 and 45 of the photonics module 30 to be mounted on the mounting member 31 using a photo-lithographic masking and etching process which is widely used in fabricating semiconductor integrated circuits with a great deal of accuracy. This causes the components of the photonics module 30 to be placed on the mounting member 31 with a great deal of accuracy. Moreover, this allows the mounting member 31 to be fabricated using batch processing. The wire leads (shown in FIGS. 1–2) on the mounting member 31 for the electrical components 40–44, the laser 38, and the photo detectors 39 and 45 are also made using the above mentioned photo-lithographic masking and etching process.

In one embodiment, the mounting member 31 is made of crystalline silicon with <100> crystallographic surfaces. Alternatively, the mounting member 31 can be made of other materials. For example, the mounting member 31 can be made of ceramic materials.

The laser 38 and the monitor 45 are bonded to the mounting member 31. In one embodiment, the laser 38 is an edge-emitting laser. In another embodiment, the laser 38 is a surface-emitting laser. To mount and align the spherical lenses 36–37 on the mounting member 31, pyramidal cavities 58 and 59 are formed in the mounting member 31 to seat the spherical lenses 36–37. The pyramidal cavities 58–59 are precision-formed in the mounting member 31 using the above mentioned photo-lithographic masking and etching process.

The photo detector 39 is bonded to a holder 46 which is then mounted on the mounting member 31. In one embodiment, the photo detector 39 is a surface detecting photo detector 39. In other embodiments, the photo detector 39 can be other kind of photo detector. The electrical components 40–44 are also mounted on the mounting member 31 in contact with the metal leads that are provided on the mounting member 31. In one embodiment, the electrical components 40–44 are surface mounted on the mounting member 31.

The partition wall 50 is mounted substantially vertically on the mounting member 31. Alternatively, the position of the partition wall 50 may not be mounted substantially vertically (i.e., may be tilted) on the mounting member 31. The partition wall 50 can be mounted on the mounting member 31 through a number of mounting methods. FIGS. 6 through 9 show some of those mounting methods that will be described in more detail below.

Referring again to FIGS. 1–2, the partition wall 50 is made of ceramic or organic material in one embodiment. In other embodiments, the partition wall 50 can be made of other materials. For example, the partition wall 50 may be made of silicon.

As can be seen from FIGS. 1–2, the partition wall 50 physically separates the laser 38 from the photo detector 39. This prevents optical interference from the laser 38 to the photo detector 39. As is known, although the laser light is substantially a coherent light, at least some light emitted from a laser radiates randomly. The randomly radiated laser light typically becomes noise if it is picked up by a photo detector. Thus, the performance of the photo detector 39 to receive optical signals is affected if the radiated laser light of the laser 38 impinges on the active region of the photo detector 39. This is typically referred to as cross talk or optical interference to the photo detector 39. By placing the partition wall 50, the laser 38 is physically isolated from the photo detector 39 and no randomly radiated laser light from the laser 38 will reach the photo detector 39.

The partition wall 50 includes a hole 52 that provides light channel between the photo detector 39 and the spherical lens 37. The size of the hole is such that only the light along the optical path between the photo detector 39 and the spherical lens 37 passes through.

The partition wall 50 also physically separates the laser 38 from the electrical components 40–44. As described above, the electrical components 40–44 are associated with the photo detector 39. The partition wall 50 has one surface (i.e., the surface 53) coated with a metal layer (not shown). In one embodiment, this surface of the partition wall 50 faces the laser 38 and monitor 45. This in essence provides an electrical shield that prevents any electrical interference between the laser 38 and the electrical components 40–44.

FIGS. 3 and 4 illustrate a photonics module 100 that includes a partition wall 102 that implements another embodiment of the present invention. FIGS. 3 and 4 show different perspective views of the photonics module 100. As can be seen from FIGS. 3–4, the partition wall 102 mounted on a mounting member 101 of the photonics module 100 is also mounted with optical and electrical components (i.e., the components 114 through 119). This approach reduces the size and cost of the mounting member 101, which in turn reduces the size and cost of the photonics module 100.

The reason that the electrical components 115–119 can be mounted on the partition wall 102 is that the placement of the electrical components 115–119 is not required to be as accurate as the placement of the optical components 110–113 on the mounting member 100. In addition, by mounting the electrical components 115–119 and the photo detector 114 on the partition wall 102, the partition wall 102 and the components 114–119 can come as a single pre-assembled and fully tested module before being mounted on the mounting member 101. The mounting of the components 114–119 on the partition wall 102 can be realized using any known printed circuit board fabrication process.

By mounting the electrical components first on the partition wall 102, defective electrical components can be eliminated before they are actually mounted on the mounting member 101. In doing so, the cost of manufacturing the photonics module 100 is further reduced and the yield of the photonics module 100 is increased.

As also can be seen from FIGS. 3–4, the photo detector 114 is also mounted on the partition wall 102. A hole (not show) is also provided in the partition wall 102 to allow light to reach photo detector 114 from the spherical lens 113. This allows a surface detecting photo detector 114 to be directly optically coupled to the spherical lens 113 without any other optical device. A cavity 120 is formed in the mounting member 101 to receive the photo detector 114 when the partition wall 102 is mounted on the mounting member 101. The wire leads on the partition wall 102 (e.g., the lead 122) and that on the mounting member (e.g., the lead 123) are connected together by conductive adhesive (e.g., conductive epoxy) at their respective joints (e.g., the joint 124).

The partition wall 102 is mounted on the mounting member 101 using the mounting methods shown in FIGS. 6–9, which will be described in more detail below. Alternatively, the partition wall 102 may be mounted on the mounting member 101 using other known mounting methods. The surface 122 of the partition wall 102 that faces the laser 110, the spherical lenses 111–112, and the optical filter 112 is coated with a metal layer (not shown). This allows the partition wall 102 to minimize optical and electrical interference between the laser 110 and the photo detector 114, and to minimize electrical interference between the laser 110 and the electrical components 115–119 that are associated with the photo detector 114. The laser 110, the spherical lenses 111 and 113, and the optical filter 112 are mounted on the mounting member 101.

FIG. 5 illustrates a photonics module 160 that includes a partition wall 162 that implements yet another embodiment of the present invention. Comparing the photonics module 160 of FIG. 5 with the photonics module 100 of FIGS. 3–4, it can be noted that the partition wall 162 of FIG. 5 is not mounted on the mounting member 161 of the photonics module 160. Instead, the partition wall 162 is bonded to an end of the mounting member 161. Adhesive is used to bond the partition wall 162 to the mounting member 161. By bonding the partition wall 162 to an end of the mounting member 161, the size of the mounting member 161 can be further minimized. In addition, the mounting process of the partition wall 162 to the mounting member 161 is simplified and more reliable, which also results in a more reliable structure for the photonics module 160. The partition wall 162 has one surface 170 coated with a metal layer (not shown) to provide the optical and electrical isolation.

Figure 6:
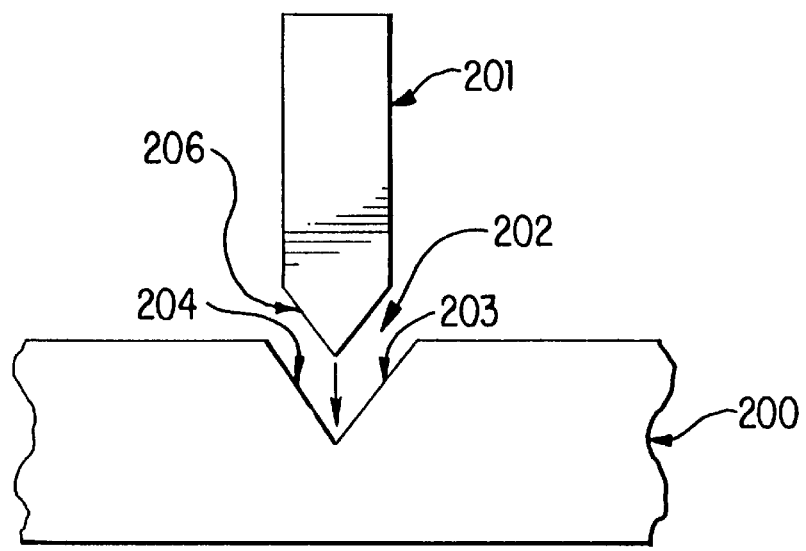
FIGS. 6 through 9 show various mounting methods for the partition walls shown in FIGS. 1–4.

FIGS. 6–9 illustrate different mounting techniques for mounting a planar partition wall substantially vertically on a mounting member. Each of FIGS. 6–9 shows a side view. Referring first to FIG. 6, the partition wall 201 and the mounting member 200 are shown to be in a coupling position. The mounting member 200 includes a groove 202 to receive the partition wall 201. The groove 202 is, for example, a V-shaped groove and the partition wall 201 has a V-shaped end 206 that matches the V-shaped groove 202. Glue or other adhesives can be used to bond the partition wall 201 after the partition wall 201 is seated in the groove 202.

The groove 202 can be formed using any known methods. For example, if the mounting member 200 is made of <100> silicon, the V-shaped groove 202 can be formed using anisotropic etching such that the side walls 203–204 of the groove 202 lie on the <111> crystallographic planes of the silicon mounting member 200. The V-shaped end 206 of the partition wall 201 can be formed by two saw cuts using, for example, dicing saw.

If the partition wall 201 is to be vertically mounted on the mounting member 200, then the V-shaped end 206 is formed by two symmetrical cuts. If the partition wall 201 is to be tilted on the mounting member 200, then the V-shaped end 206 is formed by two asymmetrical cuts at two different angles.

Figure 8:
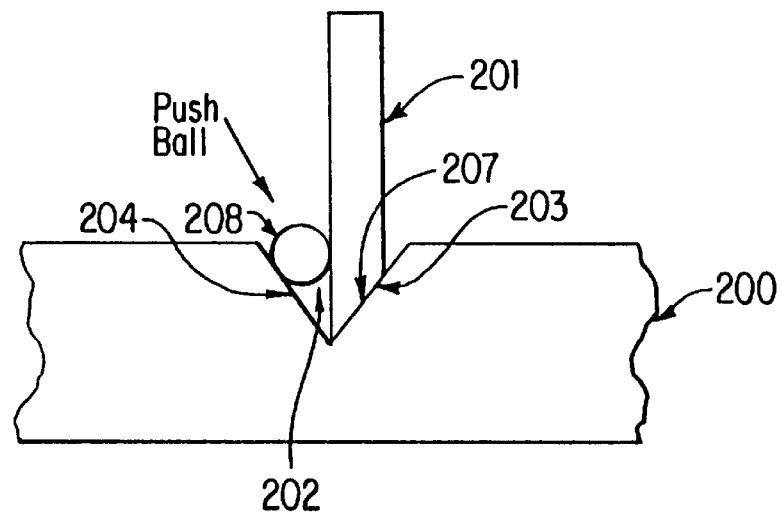

In an alternative embodiment as shown in FIG. 8, the partition wall 201 may have only one saw cut to form a sloping end 207 such that the surface of the sloping end 207 contacts one side wall (i.e., the side wall 203) of the V-shaped groove 202.

A spherical push ball 208 (or a cylindrical rod) is then placed in the V-shaped groove 202 to help hold the partition wall 201 in place in the groove 202. Alternatively, more than one push ball can be used to help secure the partition wall 201 in the groove 202. The partition wall 201 is then bonded to the mounting member 200 in the groove 202.

Figure 7:
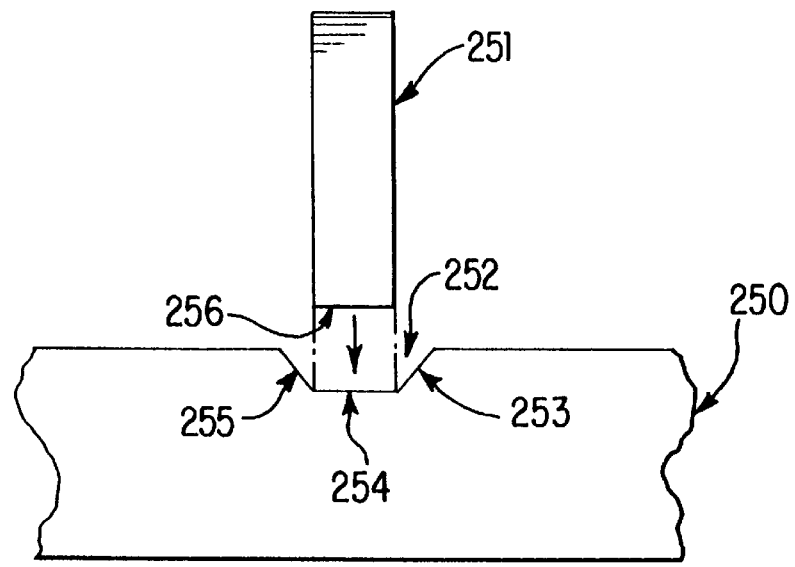

FIG. 7 shows an alternative embodiment of the arrangement of FIGS. 6 and 8. As can be seen from FIG. 7, the groove 252 in the mounting member 250 is not a V-shaped groove. Instead, the groove 252 is a truncated V-shaped groove with a flat bottom surface 254 and two sloping side walls 253 and 255. The bottom 256 of the partition wall 251 contacts the flat bottom surface 254 when the partition wall 251 is received in the groove 252. Glue or other adhesives can then be applied into the groove 252 along the gaps between the partition wall 251 and the side walls 253 and 255 to bond the partition wall 251 in the groove 252.

Figure 9:
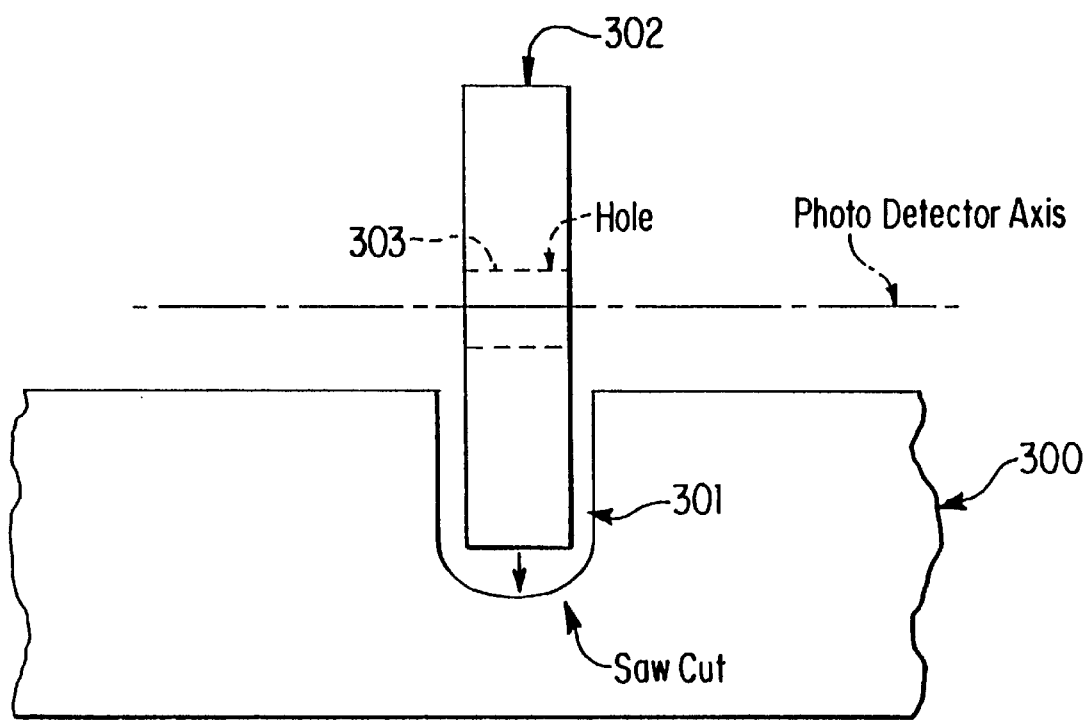

FIG. 9 shows yet another alternative embodiment of forming the groove on the mounting member. As can be seen from FIG. 9, the groove 301 is formed on the mounting member 300 using a dicing saw. This allows the side walls of the groove 301 to be substantially vertical. In this case, the partition wall 302 does not need to have a specially shaped (e.g., V-shaped) end.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A micro-photonics device, comprising:
   (A) a substrate made of semiconductor or ceramic material, wherein the substrate is not a printed circuit board;
   (B) a plurality of optical components mounted on the substrate;
   (C) a wall mounted on the substrate;
   (D) a plurality of electrical components and an optical component mounted on the wall, wherein the wall physically separates optical components from the electrical components to prevent electrical and optical interference between the optical and electrical components.

2. The micro-photonics device of claim 1, wherein the wall is made of ceramic material or organic material.

3. The micro-photonics device of claim 1, wherein the wall is bonded in a groove of the substrate.

4. The micro-photonics device of claim 1, wherein the optical component mounted on the wall is a photo detector and the optical components mounted on the substrate include a laser, spherical lenses, and an optical filter.

5. The micro-photonics device of claim 4, wherein the substrate further comprises a cavity to receive the photo detector when the wall is mounted on the substrate such that part of the photo detector is beneath the surface of the substrate.

6. A micro-photonics device, comprising:
   (A) a substrate made of semiconductor or ceramic material, wherein the substrate is not a printed circuit board;
   (B) a first plurality of optical and electrical components mounted on the substrate;
   (C) a wall attached to the substrate;
   (D) a second plurality of optical and electrical components mounted on the wall such that the wall physically separates the first plurality of optical and electrical components from the second plurality of optical and electrical components to prevent electrical and optical interference between the first and second plurality of optical and electrical components.

7. The micro-photonics device of claim 6, wherein the wall is made of ceramic material or organic material.

8. The micro-photonics device of claim 6, wherein the wall is bonded to a side of the substrate such that the first plurality of optical and electrical components do not face the second plurality of optical and electrical components.

9. The micro-photonics device of claim 6, wherein the second plurality of optical and electrical components mounted on the wall include a photo detector and the first optical and electrical components mounted on the substrate include a laser, spherical lenses, and an optical filter.

* * * * *